(12) United States Patent
Takahashi

(10) Patent No.: US 7,715,056 B2
(45) Date of Patent: May 11, 2010

(54) METHOD, APPARATUS, AND SYSTEM FOR CONTROLLING IMAGE, IMAGE FORMING APPARATUS, AND COMPUTER PRODUCT

(75) Inventor: Jun Takahashi, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 607 days.

(21) Appl. No.: 11/223,017

(22) Filed: Sep. 12, 2005

(65) Prior Publication Data

US 2006/0061798 A1 Mar. 23, 2006

(30) Foreign Application Priority Data

Sep. 17, 2004 (JP) ............................. 2004-272305

(51) Int. Cl.
*H04N 1/40* (2006.01)
(52) U.S. Cl. .................. 358/3.28; 358/1.1; 358/1.9
(58) Field of Classification Search ............ 358/3.28, 358/1.9, 1.1; 379/201.01; 399/366, 365, 399/361; 382/232
See application file for complete search history.

(56) References Cited

U.S. PATENT DOCUMENTS

| | | | |
|---|---|---|---|
| 5,467,169 A * | 11/1995 | Morikawa | 399/366 |
| 5,524,933 A | 6/1996 | Kunt et al. | |
| 6,289,125 B1 | 9/2001 | Katoh et al. | |
| 6,404,926 B1 * | 6/2002 | Miyahara et al. | 382/232 |
| 6,515,755 B1 * | 2/2003 | Hasegawa | 358/1.14 |
| 2001/0030761 A1 | 10/2001 | Ideyama | |
| 2003/0016803 A1 * | 1/2003 | Schmid et al. | 379/201.01 |
| 2003/0164973 A1 | 9/2003 | Hisatomi et al. | |
| 2003/0169443 A1 * | 9/2003 | Ando | 358/1.14 |
| 2004/0150859 A1 * | 8/2004 | Hayashi | 358/3.28 |
| 2004/0163106 A1 | 8/2004 | Schrempp et al. | |

FOREIGN PATENT DOCUMENTS

| | | |
|---|---|---|
| JP | 7-273975 | 10/1995 |
| JP | 2001-184184 | 7/2001 |
| JP | 2001-320517 | 11/2001 |
| JP | 2003-8864 | 1/2003 |
| JP | 2003-266863 | 9/2003 |
| JP | 2004-237678 | 8/2004 |

* cited by examiner

*Primary Examiner*—Thomas D Lee
(74) *Attorney, Agent, or Firm*—Oblon, Spivak, McClelland, Maier & Neustadt, L.L.P.

(57) ABSTRACT

An image control system includes an image control apparatus and an image forming apparatus. The image control apparatus includes a pattern generating unit that generates a pattern based on a preset process for preventing a fraudulent use of an image; and an image combining unit that combines the image with the pattern to generate a combined image. The image forming apparatus includes a printing unit that prints out the combined image received from the image control apparatus.

28 Claims, 17 Drawing Sheets

FIG. 5

SETTING OF NEW PATTERN — 130

PLEASE SELECT DETECTION ITEM AND ACTION, AND THEN INPUT VALUES.

1. PLEASE SELECT DETECTION ITEM — 131
   - ☐ WHEN DATA IS COPIED — 136a
   - ☐ WHEN DATA IS TRANSMITTED BY FACSIMILE — 136b
   - ☐ WHEN DATA IS COPIED BY NUMBER MORE THAN ASSIGNED NUMBER — 136c
   - ☐ WHEN DATA IS COPIED BY NUMBER OF TIMES MORE THAN ASSIGNED NUMBER OF TIMES — 136d

2. PLEASE SELECT ACTION — 132
   - ☐ STOP PRINT PROCESSING — 137a
   - ☐ TRANSMIT E-MAIL TO DESIGNATED E-MAIL ADDRESS — 137b
   - ☐ TRANSMIT FACSIMILE MESSAGE TO DESIGNATED FACSIMILE NUMBER — 137c
   - ☐ OUTPUT BLANK PAPER — 137d

3. EXPLANATION OF PATTERN (PLEASE CLICK UNDERLINE TO EDIT SELECTION) — 133

4. PATTERN NAME — 134
   PATTERN G

[ OK ]  [ CANCEL ]

FIG. 6

SETTING OF NEW PATTERN — 130

PLEASE SELECT DETECTION ITEM AND ACTION, AND THEN INPUT VALUES.

1. PLEASE SELECT DETECTION ITEM — 131

- ☐ WHEN DATA IS COPIED
- ☐ WHEN DATA IS TRANSMITTED BY FACSIMILE
- ☑ WHEN DATA IS COPIED BY NUMBER MORE THAN ASSIGNED NUMBER
- ☐ WHEN DATA IS COPIED BY NUMBER OF TIMES MORE THAN ASSIGNED NUMBER OF TIMES

2. PLEASE SELECT ACTION — 132

- ☐ STOP PRINT PROCESSING
- ☑ TRANSMIT E-MAIL TO DESIGNATED E-MAIL ADDRESS
- ☐ TRANSMIT FACSIMILE MESSAGE TO DESIGNATED FACSIMILE NUMBER
- ☐ OUTPUT BLANK PAPER

3. EXPLANATION OF PATTERN (PLEASE CLICK UNDERLINE TO EDIT SELECTION) — 133

WHEN DATA IS COPIED BY NUMBER MORE THAN ASSIGNED NUMBER ← 138
TRANSMIT E-MAIL TO DESIGNATED E-MAIL ADDRESS ← 139

4. PATTERN NAME — 134

PATTERN G

[ OK ]   [ CANCEL ]

FIG. 7

ASSIGNMENT OF NUMBER — 140

PLEASE ASSIGN NUMBER

[ 10 ] OR MORE

[ CANCEL ]  [ OK ]

DESIGNATION OF E-MAIL ADDRESS

PLEASE DESIGNATE E-MAIL ADDRESS kanri@xxx.co.jp — 151

ADD FROM ADDRESS BOOK — 153

NAME OF TRANSMISSION DESTINATION

ADMINISTRATION SECTION — 152

ADD MORE — 154

DESIGNATED E-MAIL ADDRESSES

| SUZUKI (SECTION HEAD) | suzuki@xxx.co.jp |
| TAMURA (SECTION CHIEF) | tamura@xxx.co.jp |

— 155

[ CANCEL ]  [ OK ]

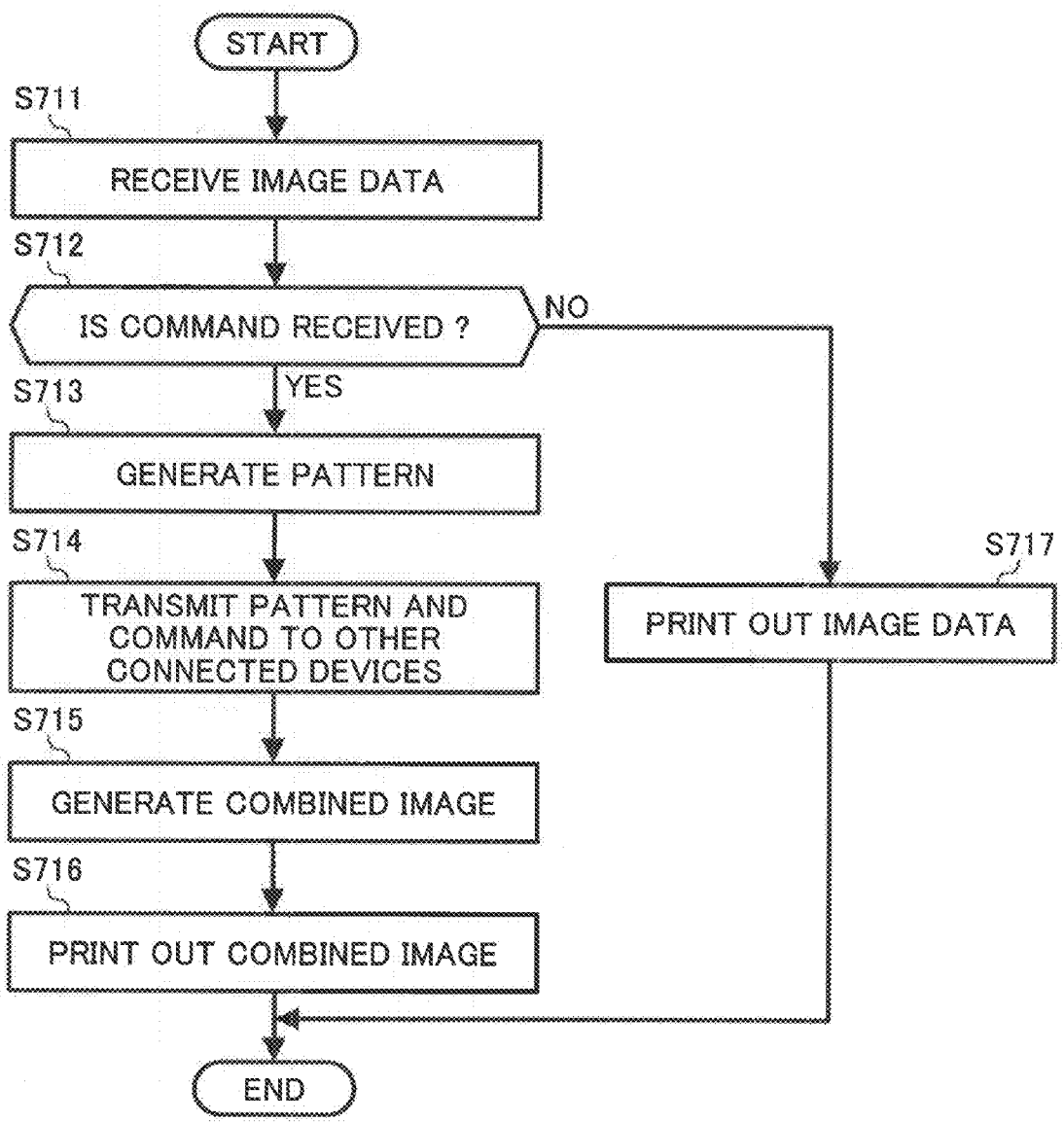

METHOD, APPARATUS, AND SYSTEM FOR CONTROLLING IMAGE, IMAGE FORMING APPARATUS, AND COMPUTER PRODUCT

CROSS-REFERENCE TO RELATED APPLICATIONS

The present document incorporates by reference the entire contents of Japanese priority document, 2004-272305 filed in Japan on Sep. 17, 2004.

BACKGROUND OF THE INVENTION

1. Field of the Invention

The present invention relates to a technology for preventing a fraudulent use of an image.

2. Description of the Related Art

Conventionally, to prevent a fraudulent use of a highly confidential image, a technique of printing the image by adding a fraudulent-use preventing pattern to the image is devised. The fraudulent-use preventing pattern is added to the whole or a part of the background of the image. Upon detecting the fraudulent-use preventing pattern, an image forming apparatus psychologically inhibits a user from fraudulently using the image, or prevents a leakage of information included in the image.

For example, when an image forming apparatus such as a digital copy machine copies a printed material added with the fraudulent-use preventing pattern, a copy guard character string of "copy prohibited" or the like appears on the paper. As a result, it is possible to know that the output printed image is a fraudulently copied image.

Image forming apparatuses that, upon detecting a fraudulent-use preventing pattern, print an image by destroying the printed surface of the image in a white or grey color, are also devised. These image forming apparatuses can prevent a leakage of information included in the fraudulently used image.

For example, a digital copy machine according to Japanese Patent Application Laid-Open No. H7-273975 detects presence of a fraudulent-use preventing pattern in image data read by a scanner. When a fraudulent-use preventing pattern is detected, the digital copy machine masks the image data (destroys the image), and discharges blank paper.

An image forming apparatus according to Japanese Patent Application Laid-Open No. 2003-8864 detects presence of a fraudulent-use preventing pattern in image data read by a scanner. When a fraudulent-use preventing pattern is detected, the image forming apparatus adds a copy guard character string or stops printing, depending on a type of the fraudulent-use preventing pattern.

However according to the conventional techniques, a processing such as a destruction of an image or an addition of a copy guard character string, carried out upon detection of a fraudulent-use preventing pattern, is determined in advance. Therefore, a user cannot optionally set a processing to be carried out when an image is fraudulently used.

The processing such as the destruction of an image or the addition of a copy guard character string is carried out inside the image forming apparatus. Therefore, a concerned party cannot instantly know the fact that an image is fraudulently used or an image is about to be fraudulently used.

Furthermore, the image forming apparatus (for example, a printer) adds a fraudulent-use preventing pattern at the time of printing the image. Therefore, the fraudulent-use preventing pattern cannot be added to the image unless the image forming apparatus having the function of adding the fraudulent-use preventing pattern.

SUMMARY OF THE INVENTION

It is an object of the present invention to at least solve the problems in the conventional technology.

An image control system according to an aspect of the present invention includes an image control apparatus and an image forming apparatus. The image control apparatus includes a process setting unit that sets information on a process for preventing a fraudulent use of the image; a pattern generating unit that generates a pattern for preventing the fraudulent use of the image based on the information; an image combining unit that combines the image with the pattern to generate a combined image; and a transmitting unit that transmits the combined image to the image forming apparatus. The image forming apparatus includes a receiving unit that receives the combined image from the image control apparatus; and a printing unit that prints out the combined image.

An image control system according to another aspect of the present invention includes an image control apparatus and an image forming apparatus. The image control apparatus includes a process setting unit that sets information on a process for preventing a fraudulent use of the image; and a transmitting unit that transmits the information and the image to the image forming apparatus. The image forming apparatus includes a receiving unit that receives the information and the image from the image control apparatus; a pattern generating unit that generates a pattern for preventing the fraudulent use of the image based on the information; an image combining unit that combines the image with the pattern to generate a combined image; and a printing unit that prints out the combined image.

An image control apparatus according to still another aspect of the present invention includes: a process setting unit that sets information on a process for preventing a fraudulent use of an image; a pattern generating unit that generates a pattern for preventing the fraudulent use of the image based on the information; an image combining unit that combines the image with the pattern to generate a combined image; and a transmitting unit that transmits the combined image to an image forming apparatus.

An image control apparatus according to still another aspect of the present invention includes: a process setting unit that sets information on a process for preventing a fraudulent use of an image; and a transmitting unit that transmits the information and the image to an image forming apparatus.

An image forming apparatus according to still another aspect of the present invention includes: a receiving unit that receives a combined image from an image control apparatus; and a printing unit that prints out the combined image. The image control apparatus generates a pattern based on information on a process for preventing a fraudulent use of an image, and combines the image with the pattern to generate the combined image.

An image forming apparatus according to still another aspect of the present invention includes: a receiving unit that receives an image and information on a process for preventing an fraudulent use of the image from an image control apparatus; a pattern generating unit that generates a pattern for preventing the fraudulent use of the image based on the information; an image combining unit that combines the image with the pattern to generate a combined image; and a printing unit that prints out the combined image.

An image control method according to still another aspect of the present invention includes: setting information on a process for preventing a fraudulent use of an image; generating a pattern for preventing the fraudulent use of the image based on the information; combining the image with the pattern to generate a combined image; and printing out the combined image.

A computer-readable recording medium that stores a computer program that causes a computer to execute the above method.

The other objects, features, and advantages of the present invention are specifically set forth in or will become apparent from the following detailed description of the invention when read in conjunction with the accompanying drawings.

BRIEF DESCRIPTION OF THE DRAWINGS

FIGS. 5 and 6 are examples of a setting screen of a new pattern;

FIGS. 7 and 8 are examples of a detailed setting screen of setting items;

FIG. 18 is a flowchart of a processing of the printer printing out image data transmitted from the image control device.

DETAILED DESCRIPTION OF THE PREFERRED EMBODIMENTS

Exemplary embodiments of the present invention will be explained in detail with reference to the accompanying drawings.

Figure 1:
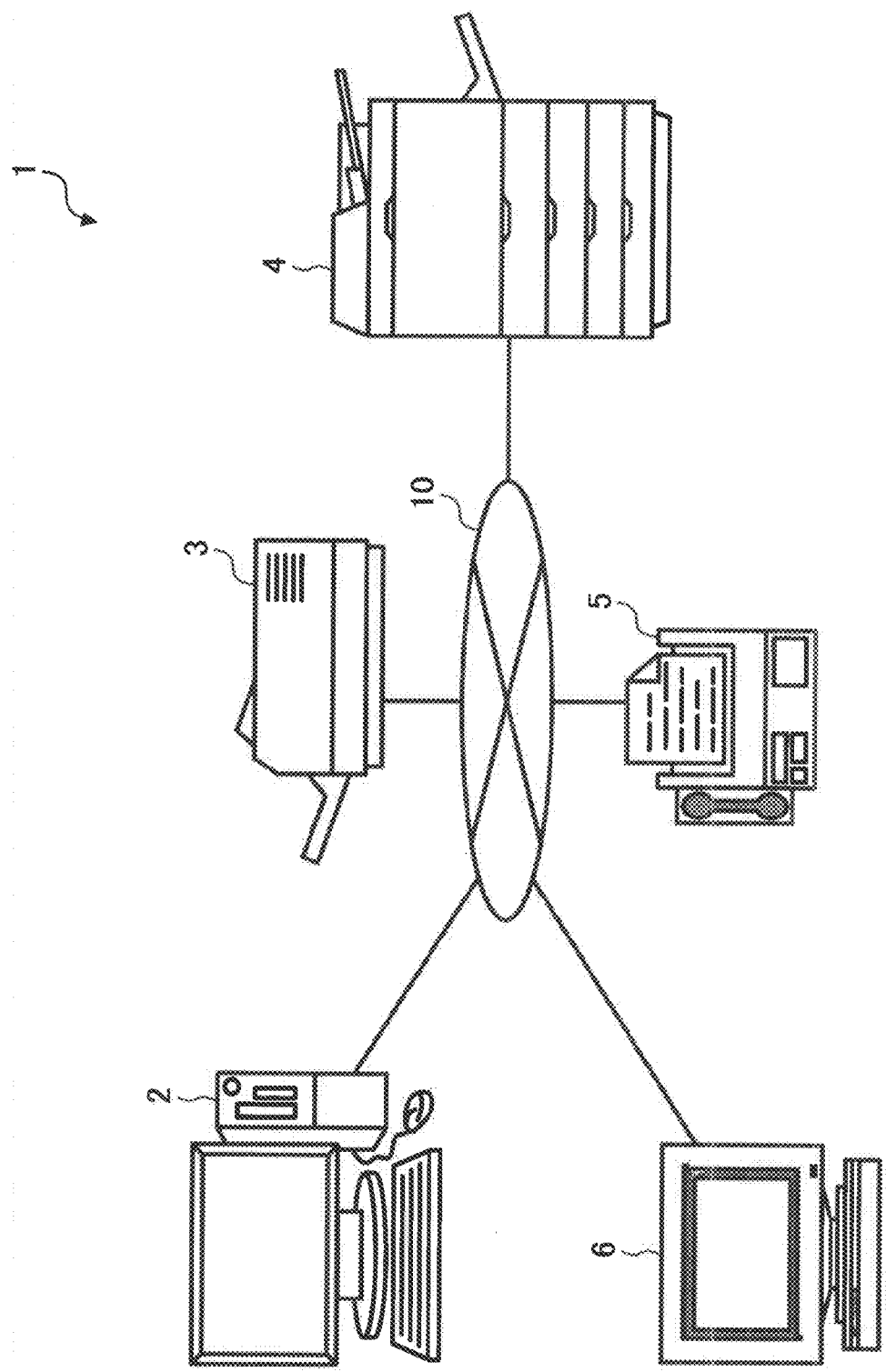
FIG. 1 is a diagram of an image control system according to a first embodiment of the present invention.

FIG. 1 is a diagram of an image control system according to a first embodiment of the present invention. An image control system 1 includes an image control device 2, a printer 3, a multifunction product (MFP) 4, a facsimile machine 5, and a personal computer (PC) 6 connected to a network 10 respectively. These devices can exchange data with each other via the network 10.

The image control device 2 generates, edits, and holds image data of documents and photographs. When image data which is generated, edited, and held by the image control device 2 is to be printed out, the image data is output from the image control device 2 to the printer 3 or the MFP 4. The printer 3 or the MFP 4 prints out the image data, thereby obtaining a printed image. Another device that is connected to the network 10 and has a print output function can print out the image data using the function.

The image control device 2 can also print out and store image data that is generated, edited, and held, by adding a fraudulent-use preventing pattern to the image data. An image forming apparatus detects the fraudulent-use preventing pattern added by the image control device 2 to the image data. Then the image forming apparatus carries out a processing which is carried out when the image data is fraudulently used (hereinafter, "a fraudulent-use preventing process"), based on the fraudulent-use preventing pattern.

The printer 3 prints out image data that is output from the image control device 2 and other devices connected to the network 10. The MFP 4 has a copy function, a facsimile transmission function, and an email transmission function, in addition to a print output function that is similar to that of the printer 3. The facsimile machine 5 exchanges facsimile data with other connected devices. The PC 6 edits documents and images, and transmits and receives emails.

Figure 2:
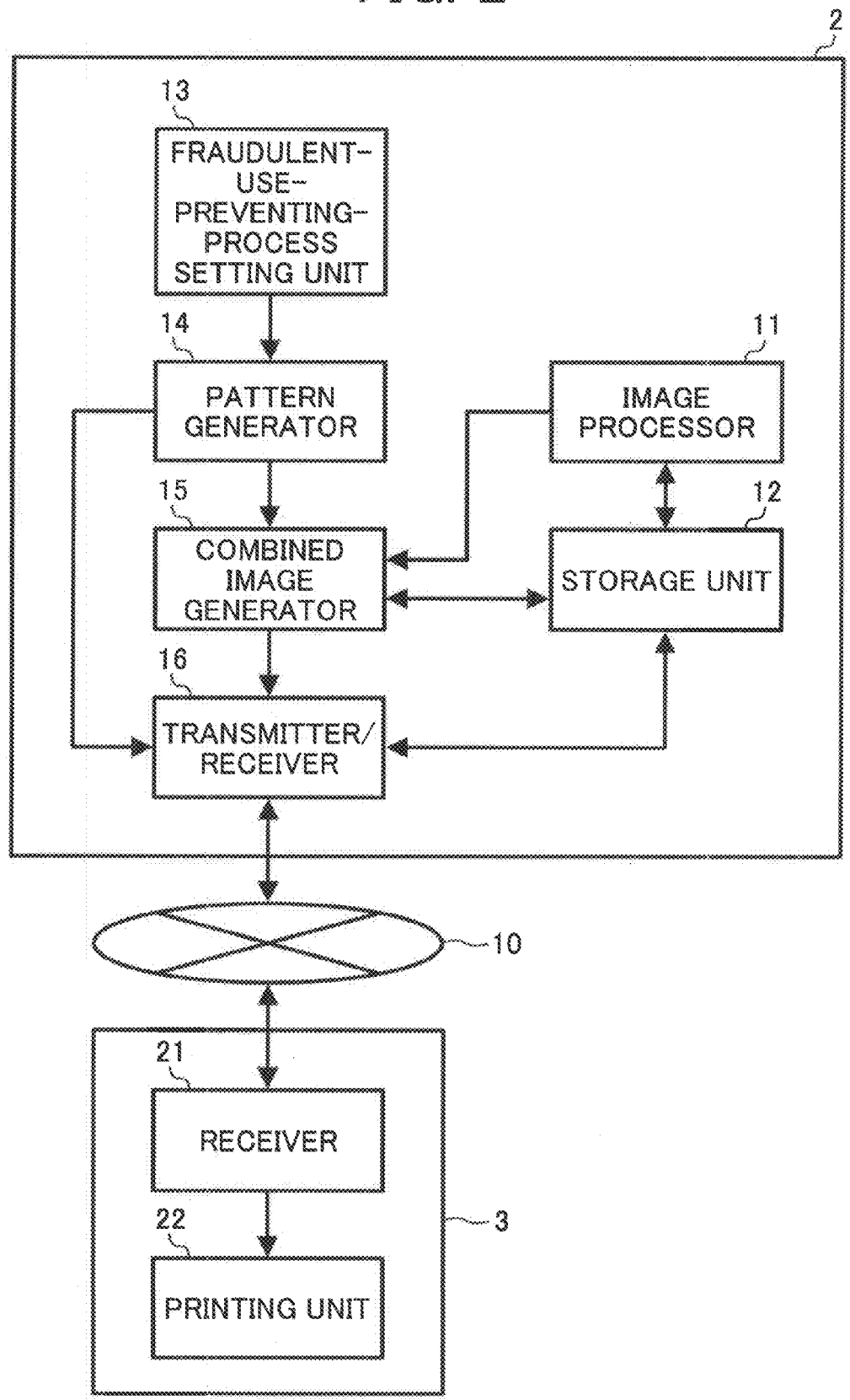
FIG. 2 is a block diagram of an image control device and an image forming apparatus in the image control system.

FIG. 2 is a block diagram of the image control device and the image forming apparatus. The image control device 2 includes an image processor 11, a storage unit 12, a fraudulent-use-preventing-process setting unit 13, a pattern generator 14, a combined image generator 15, and a transmitter/receiver 16.

The image processor 11 generates and edits image data. The image processor 11 also edits image data stored in the storage unit 12, described later, and image data obtained from other connected devices via the transmitter/receiver 16, described later. The storage unit 12 stores image data generated and edited by the image processor 11, and stores image data obtained from other connected devices via the transmitter/receiver 16.

The fraudulent-use-preventing-process setting unit 13 sets a fraudulent-use preventing process for individual image data, and also sets a determination standard to determine which kind of use is a fraudulent use, to the individual image data. An example of the setting of a fraudulent-use preventing process is explained with reference to FIGS. 3 to 8.

Figure 3:
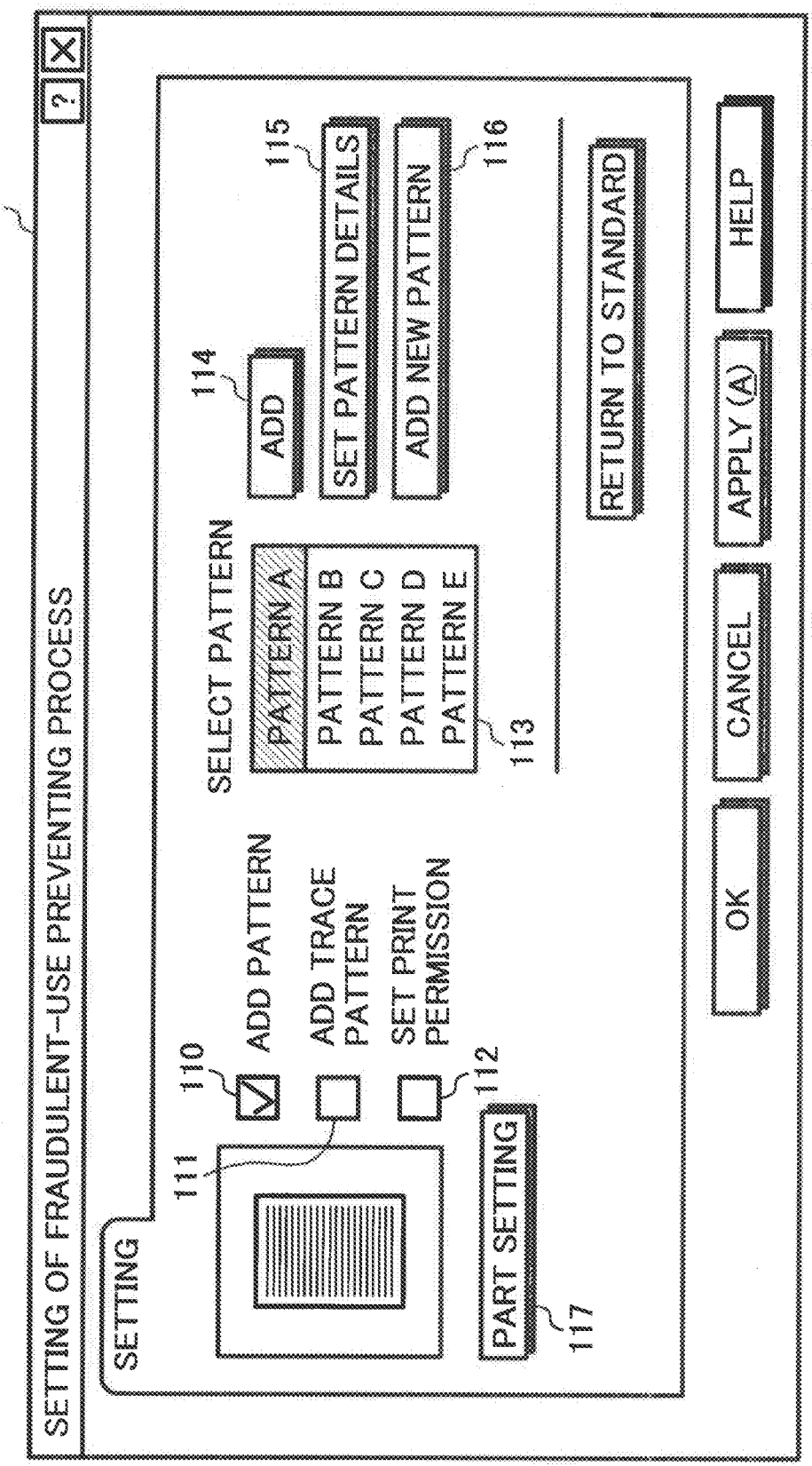
FIGS. 3 and 4 are examples of a setting screen of a fraudulent-use preventing process.
Figure 4:
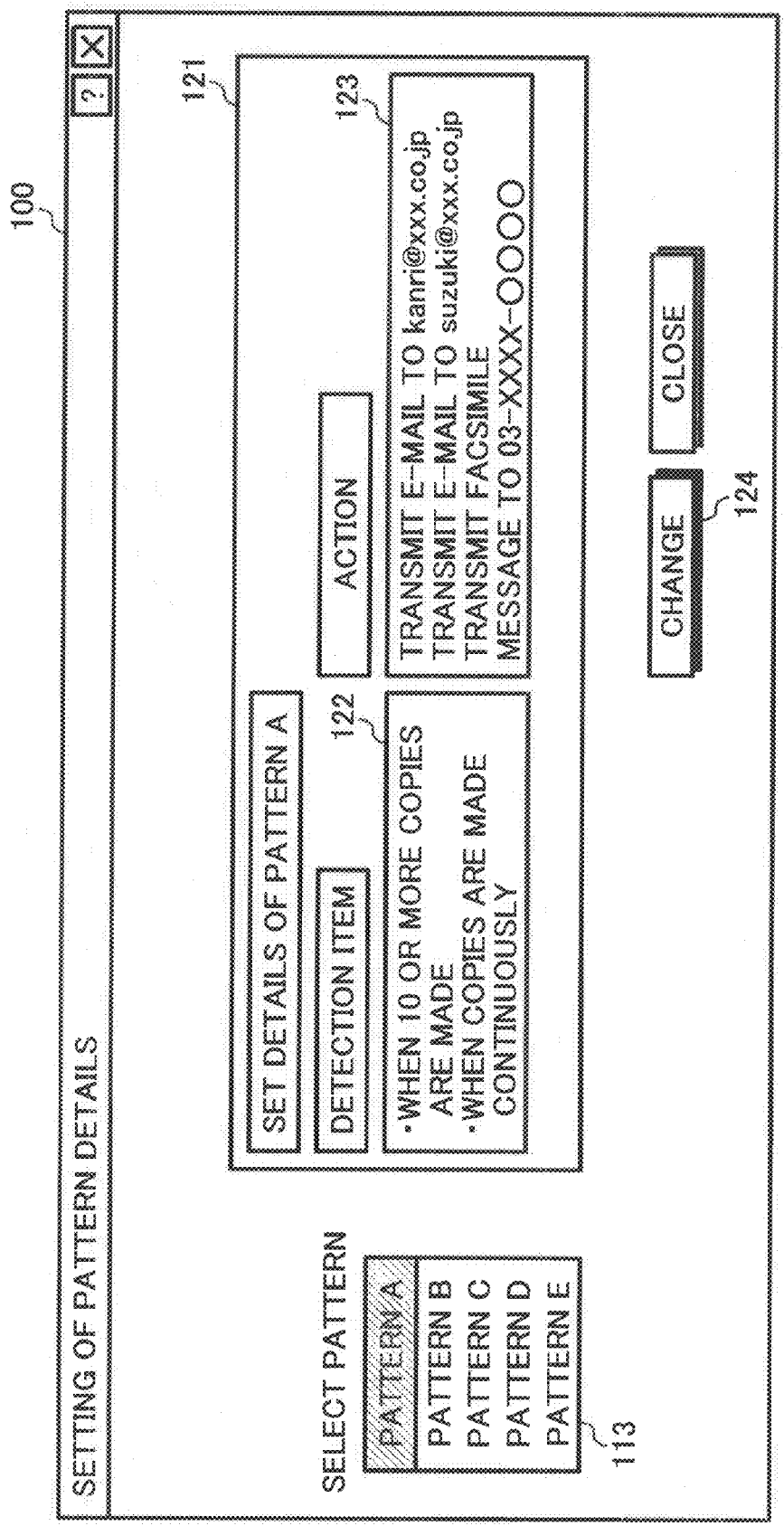

FIGS. 3 and 4 are examples of a setting screen of the fraudulent-use preventing process. While a fraudulent-use preventing process can be set at an optional timing, it is assumed herein that this setting is carried out during the execution of an edit application of image data. First, a user displays a fraudulent-use-preventing-process setting screen 100 during the execution of the application. A pattern addition checkbox 110, a trace pattern addition checkbox 111, a print permission setting checkbox 112, a pattern selection box 113, an addition button 114, a pattern detailed setting button 115, a new pattern addition button 116, and the like are displayed on the display screen of the fraudulent-use-preventing-process setting screen 100.

The user can set a fraudulent-use preventing process each time. When the setting is carried out frequently, a pattern generated by the pattern generator 14, described later, can be registered based on a previous setting. In this case, the fraudulent-use preventing process can be set by selecting the registered pattern, thereby avoiding the work of same setting each time. In the example shown in FIGS. 3 and 4, the fraudulent-use preventing process is set by selecting a pattern.

When a checkmark is placed in the pattern addition checkbox 110, the pattern selection box 113 is displayed. Pattern names of registered patterns are displayed in the pattern selection box 113. The user selects a pattern name corresponding to a fraudulent-use preventing process to be set from among the pattern names displayed in the pattern selection box 113, and depresses the addition button 114. As a result, the user can select a pattern to be added to image data being edited.

In some cases, the fraudulent-use preventing process does not need to be set to the whole image data, such as when a confidential matter is written on only the first page of plural image data. In this case, a part setting button 117 can be provided, and a pattern can be added to only a part of the image data.

When the user depresses the pattern detailed setting button 115, details of a pattern selected by the pattern selection box 113 can be set. FIG. 4 is an example of a setting of details of a pattern A selected in the pattern selection box 113. In a pattern A detailed setting display 121, a detection item display 122 and an action display 123 are displayed.

Detection items of the pattern A are displayed in the detection item display 122. A detection item is used to detect a fraudulent use of image data when a printed material added with this pattern is handled as the detection item. For example, in FIG. 4, "When 10 or more copies are made" and "When copy is made continuously" are set as detection items of the pattern A. In other words, when 10 or more copies of the printed material added with the pattern A are made, or when the printed material is copied continuously, this is detected as a fraudulent use of the printed material.

Actions to be taken when a detection item of the pattern A is detected are displayed in the action display 123. The action to be taken when a detection item is detected is a processing to be carried out when a fraudulent use of a printed material added with a pattern is detected. For example, in FIG. 4, "Transmit email to kanri@xxx.co.jp", "Transmit email to suzuki@xxx.co.jp", and "Transmit facsimile message to 03-xxxx-OOOO" are set as actions to be taken when the detection items of the pattern A are detected. In other words, when detected that the printed material added with the pattern A is fraudulently used, an email is transmitted to kanri@xxx.co.jp and to suzuki@xxx.co.jp respectively, and a facsimile message is transmitted to 03-xxxx-OOOO.

When the detailed setting of the pattern is to be changed, a change button 124 is depressed, thereby changing the detailed setting. When a pattern of a desired setting is not present, the new pattern addition button 116 shown in FIG. 3 is depressed, thereby carrying out a desired setting and adding this setting as a new pattern.

FIGS. 5 and 6 are examples of a setting screen of a new pattern. A detection item selection box 131, an action selection box 132, a detailed setting box 133, and a pattern name setting box 134 are displayed in a new pattern setting display unit 130.

Detection items 136a to 136d to be detected as a fraudulent use of data are displayed in the detection item selection box 131. In FIG. 5, "When data is copied", "When data is transmitted by facsimile machine", "When data is copied by number more than assigned number", and "When data is copied by number of times more than assigned number of times" are displayed in the detection item selection box 131. The user places a checkmark in a desired detection item checkbox, thereby selecting a detection item.

Actions 137a to 137d to be taken when a fraudulent use of data is detected are displayed in the action selection box 132. In FIG. 5, "Stop print processing", "Transmit email to designated email address", "Transmit facsimile message to designated facsimile number", and "Output blank paper" are displayed in the action selection box 132. The user places a checkmark in a desired action checkbox, thereby selecting an action to be taken when a fraudulent use of data is detected.

Detection items and actions that are selected in the detection item selection box 131 and the action selection box 132 are displayed in the detailed setting box 133, thereby setting the details. An optional pattern name is input to the pattern name setting box 134, thereby setting the pattern name. In FIG. 5, "Pattern G" is set as a pattern name in the pattern name setting box 134.

For example, in FIG. 6, "When data is copied by number more than assigned number" is selected as a detection item and "Transmit email to designated email address" is selected as an action to be taken. Terms, "by number more than assigned number" and "to designated email address" are underlined respectively, thereby forming underlined parts 138 and 139. The underlined items indicate that these items can be set in further detail.

FIGS. 7 and 8 are examples of a detailed setting screen of setting items. For example, when the underlined part 138 is clicked, a number assignment window 140 shown in FIG. 7 is activated. When an optional number is set to the number assignment window 140, the number can be assigned to the detection item of "When data is copied by number more than assigned number". In FIG. 7, 10 copies are assigned. When more than 10 copies are made, this is detected as a fraudulent use of the data.

When the underlined part 139 is clicked, an email-address assignment window 150 shown in FIG. 8 is activated. An email-address input area 151 is displayed in the email-address assignment window 150. When an optional email address is input to the email-address input area 151, a transmission destination to which an email is to be transmitted upon detecting a fraudulent use of the data can be assigned. A name at the transmission destination can be input to a transmission-destination-name input area 152. In FIG. 8, "kanri@xxx.co.jp" is assigned as a transmission destination email address. "Administration Section" is input as the name of the transmission destination of the email address.

Assignment of a transmission destination email address can be selected from an address book of email software. In this case, an "Add from address book" button 153 is depressed, thereby activating the address book. A transmission destination email address is assigned from the registered email address. An email can be transmitted to a plurality of transmission destinations. When the user wants to add a transmission destination, an "Add more" button 154 is depressed, thereby adding a transmission destination email address.

Email addresses already assigned are displayed in a designated email address box 155. In FIG. 8, an email address suzuki@xxx.co.jp of "Suzuki section head" and an email address tamura@xxx.co.jp of "Tamura section chief" are already assigned as the transmission destinations in the designated email address box 155.

The fraudulent-use preventing process can be also set to each time window. For example, when data is fraudulently used at night and an email is transmitted to an email address used in the company, the concerned parties cannot instantly know this fact. In this case, for example, if it is set that an email is transmitted to designated email addresses of portable telephones of the concerned parties after 6 o'clock in the afternoon, the fact of fraudulent use of the data can be promptly notified to the concerned parties, thereby increasing chances of preventing leakage of the confidential information.

As a fraudulent-use preventing process which is carried out when an image is fraudulently read, transmission of the read-image data can be assigned. With this arrangement, the type of the fraudulently used image can be confirmed instantly. In addition to the prevention of fraudulent use of data, for example, an erroneous distribution of scan-read data can be also prevented.

When image data is obtained by reading a document image with a scanner, the read image data is sometimes erroneously transmitted to a wrong destination. When the document image includes a confidential matter, this erroneous transmission may leak the confidential matter. Therefore, a generated fraudulent-use preventing pattern is added to a document image by assigning a correct transmission destination in advance. When the document is read with a scanner based on this arrangement, the scan-read data can be transmitted to the correct transmission destination. As a result, an erroneous transmission by a scan-read operator due to an error in the assignment of the transmission destination address can be prevented.

As described above, the fraudulent-use-preventing-process setting unit 13 receives the setting of the image data fraudulent-use preventing process.

Referring back to FIG. 2, the pattern generator 14 generates a fraudulent-use preventing pattern based on the fraudulent-use preventing process set by the fraudulent-use-preventing-process setting unit 13. The fraudulent-use preventing pattern is a tint block that is embedded into the background of a document image to be printed. Generally, in many cases, a fraudulent-use preventing pattern is configured by adding a tint block that appears uniformly at a print time, so that when the printed image is copied, a copy guard character string of "copy prohibited" or the like appears on the copied paper.

Information can also be embedded into a fraudulent-use preventing pattern based on a combination of a pattern and colors. For example, to show print source information at the information leak time, date and time of the printing, a host name, a user name, and an Internet protocol (IP) address can be embedded into the fraudulent-use preventing pattern. This pattern is called a "trace pattern". Based on the output printed image, an output source can be specified, thereby analyzing the state of a fraudulent use and psychologically inhibiting the user from fraudulently using the image.

As explained above, a technique of embedding information into the fraudulent-use preventing pattern is known. The image control device 2 embeds the information of the fraudulent-use preventing process set by the fraudulent-use-preventing-process setting unit 13 into the fraudulent-use preventing pattern generated by the pattern generator 14.

Figure 9:
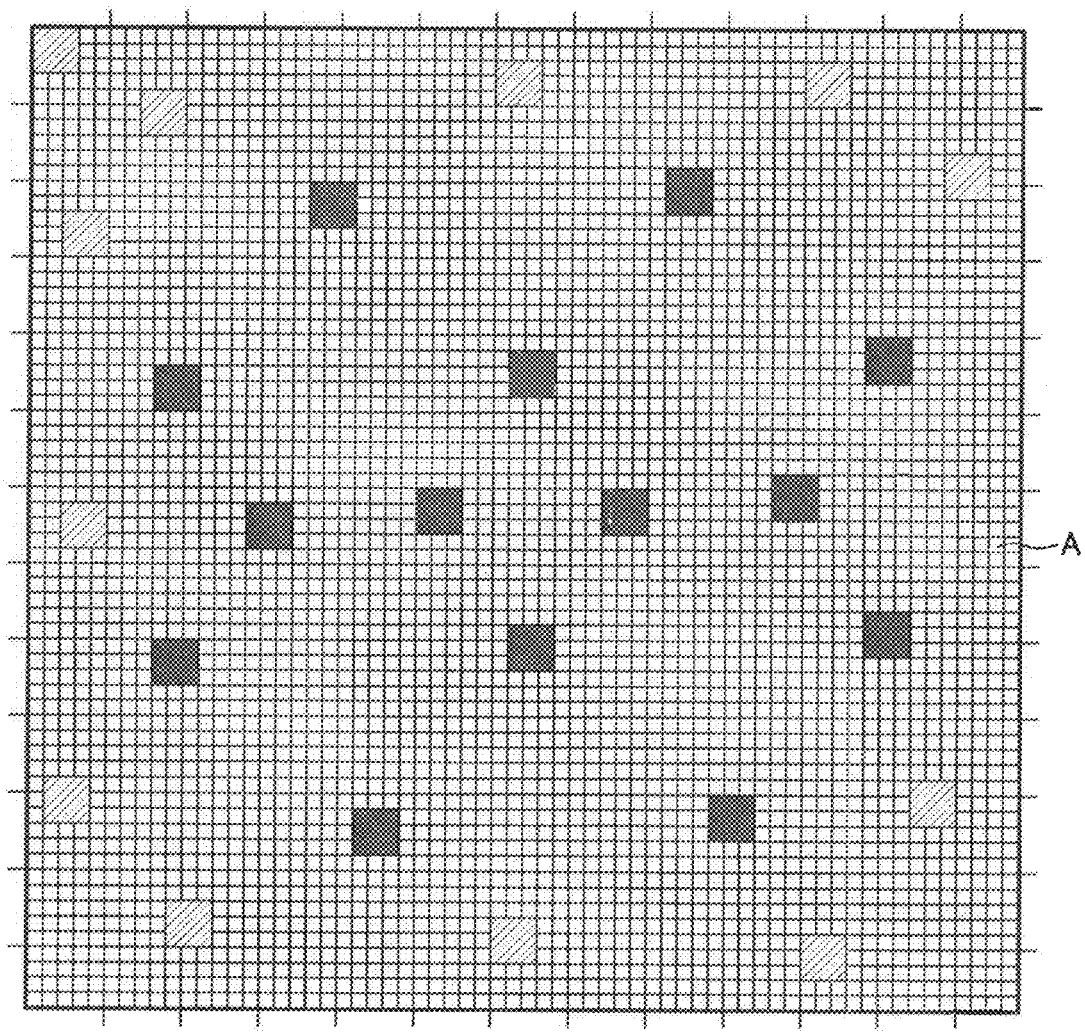
FIGS. 9 and 10 are examples of a basic pattern of a fraudulent-use preventing pattern.
Figure 10:
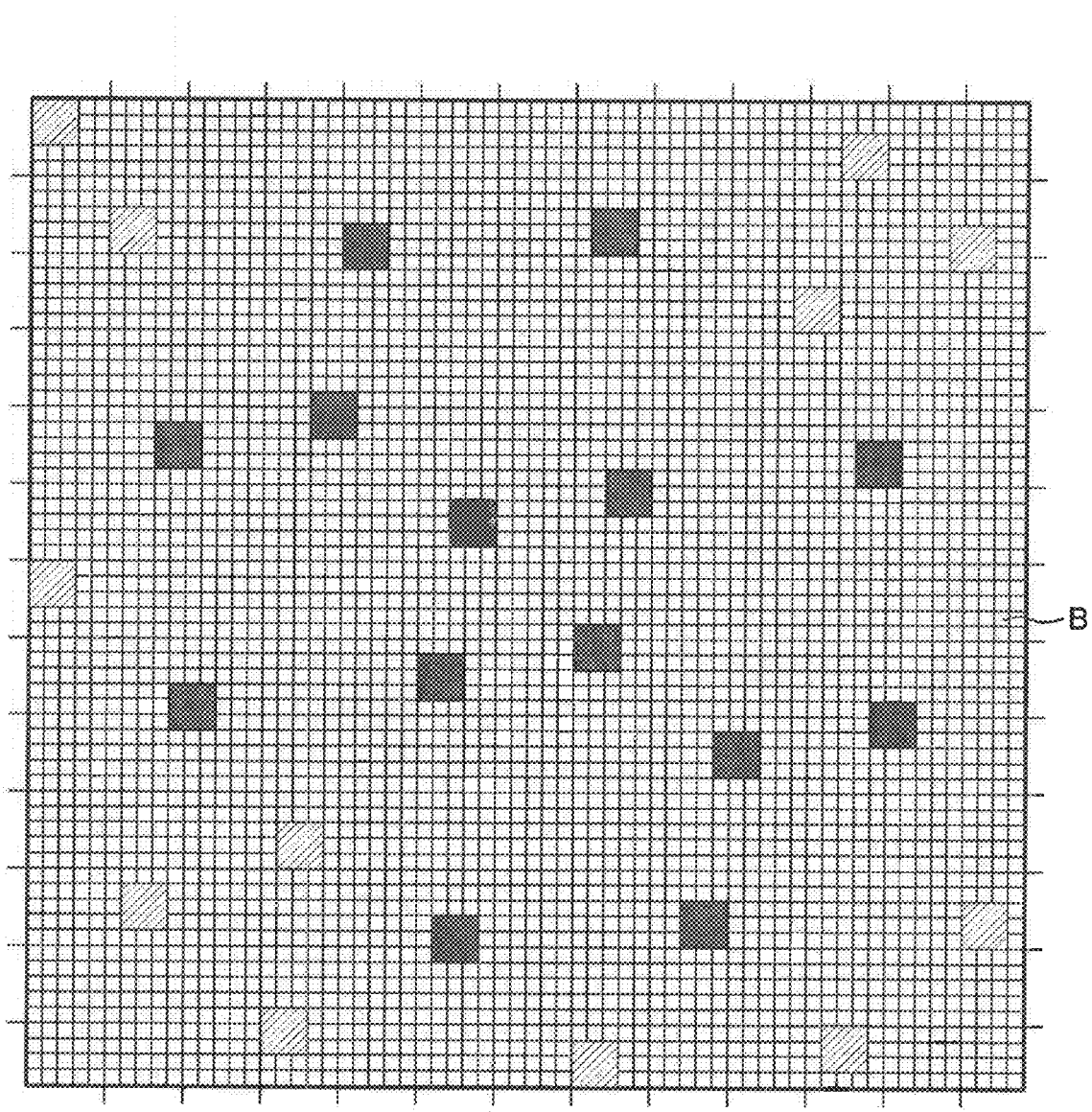

FIGS. 9 and 10 are examples of a basic pattern of the fraudulent-use preventing pattern. The pattern generator 14 forms a minimum basic pattern as shown in FIGS. 9 and 10 based on a fraudulent-use preventing process that is set by the fraudulent-use-preventing-process setting unit 13. The basic pattern shown in FIG. 9 is called a "pattern A", and the basic pattern shown in FIG. 10 is called a "pattern B".

In the examples shown in FIGS. 9 and 10, a minimum square represents one pixel, and a pattern of 64×64 pixels is the basic pattern. While the layout of the dots is apparently meaningless, the layout includes a dummy pattern which prevents the fraudulent user from analyzing a command embedded in the fraudulent-use preventing pattern. The generated basic pattern is output to the combined image generator 15 described later.

The pattern generator 14 outputs the generated fraudulent-use preventing pattern and the information of the fraudulent-use preventing process to be carried out when the image data added with the fraudulent-use preventing pattern is used fraudulently, to the transmitter/receiver 16. The fraudulent-use preventing pattern and the information of the fraudulent-use preventing process that are output are transmitted to other devices connected to the network 10, and are shared by the devices that constitute the image control system 1. Each device uses these pieces of information for the setting to detect a fraudulent use of the image data.

Instead of the transmission by the transmitter/receiver 16, an operator can input the fraudulent-use preventing pattern and the information of the fraudulent-use preventing process to the devices that constitute the image control system 1 to share the information.

Referring back to FIG. 2, the combined image generator 15 combines the basic pattern generated by the pattern generator 14 with the print image data, thereby generating a combined image. The image processor 11 processes or the storing unit 12 stores the print image data. The combined image generator 15 sequentially disposes the basic patterns generated by the pattern generator 14, in the background of the image to be printed, thereby generating a combined image.

Figure 11:
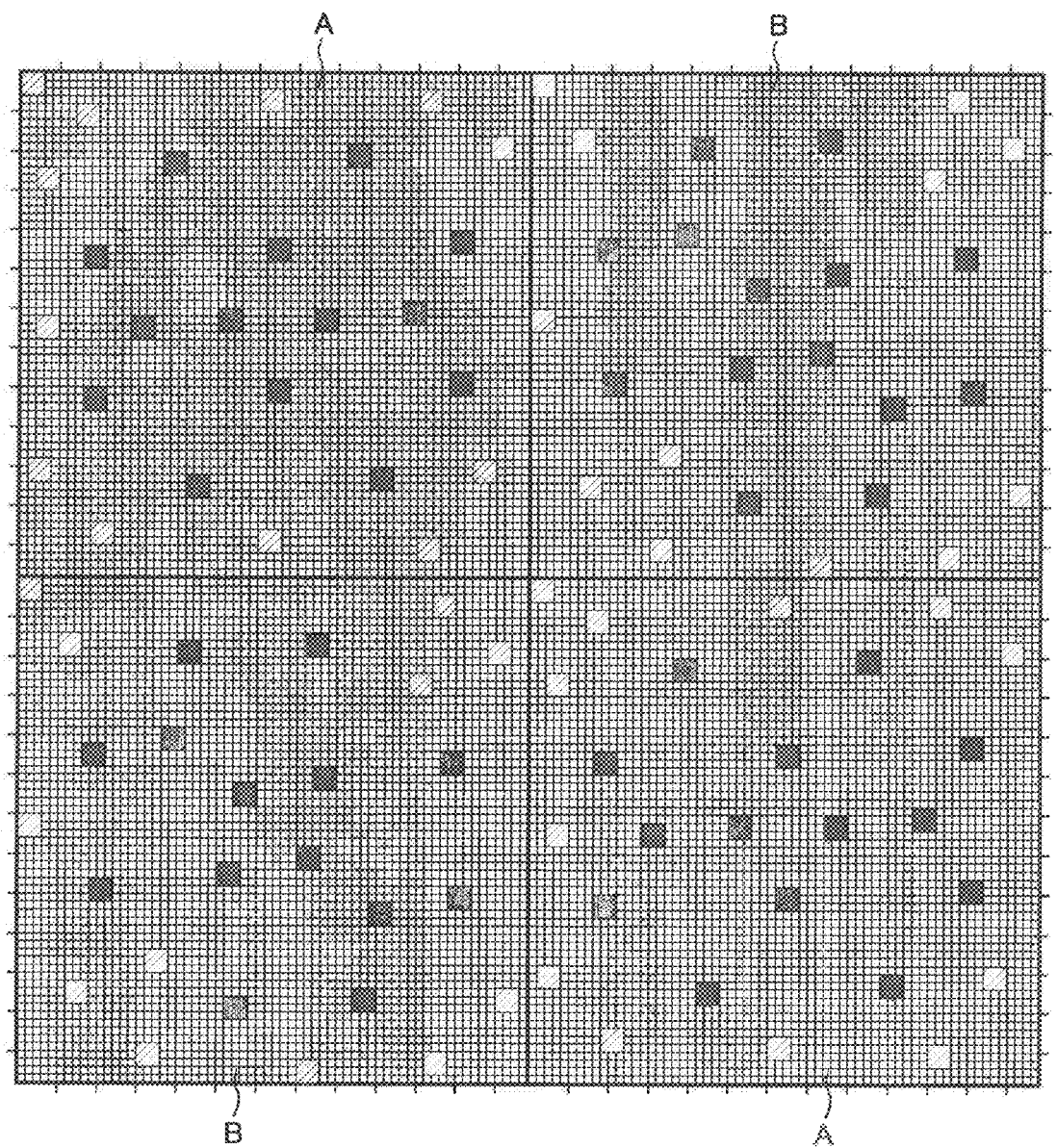
FIG. 11 is an example of a layout of the basic patterns.

FIG. 11 is an example of a layout of the basic patterns. For example, basic patterns are embedded into the background of the print image in the layout as shown in FIG. 11. In the example shown in FIG. 11, A denotes the pattern A shown in FIG. 9, and B denotes the pattern B shown in FIG. 10. The pattern A and the pattern B are disposed such that these patterns are not adjacent to each other. By repeating the above layout, the whole background of the document image is embedded with the basic patterns, thereby generating a combined image. The generated image is transmitted to the transmitter/receiver 16.

Referring back to FIG. 2, the transmitter/receiver 16 is connected to the network 10, and transmits the combined image generated by the combined image generator 15 to the printer 3. The fraudulent-use preventing pattern output from the pattern generator 14, and the fraudulent-use preventing process to be carried out when the image data added with the fraudulent-use preventing pattern is fraudulently used, are transmitted to other devices connected to the network 10.

Based on the above configuration, the image control device 2 generates, edits, and holds image data, and adds a fraudulent-use preventing pattern to the image data that is generated, edited, and held.

The printer 3 is one example of the image forming apparatus that has a print output function. The printer 3 prints out image data that is output from the image control device 2. The printer 3 includes a receiver 21 and a printing unit 22. The receiver 21 receives image data of which printing is requested, from the image control device 2 or other devices connected to the network 10. The printing unit 22 prints out the image data received by the receiver 21. The document image that is printed out is added with the fraudulent-use preventing pattern. When the document image is fraudulently used, the fraudulent-use preventing process that is set by the fraudulent-use-preventing-process setting unit 13 is carried out.

With the above configuration, the printer 3 prints out the image data that is generated and edited by the image control device 2, thereby obtaining the printed image.

Figure 12:
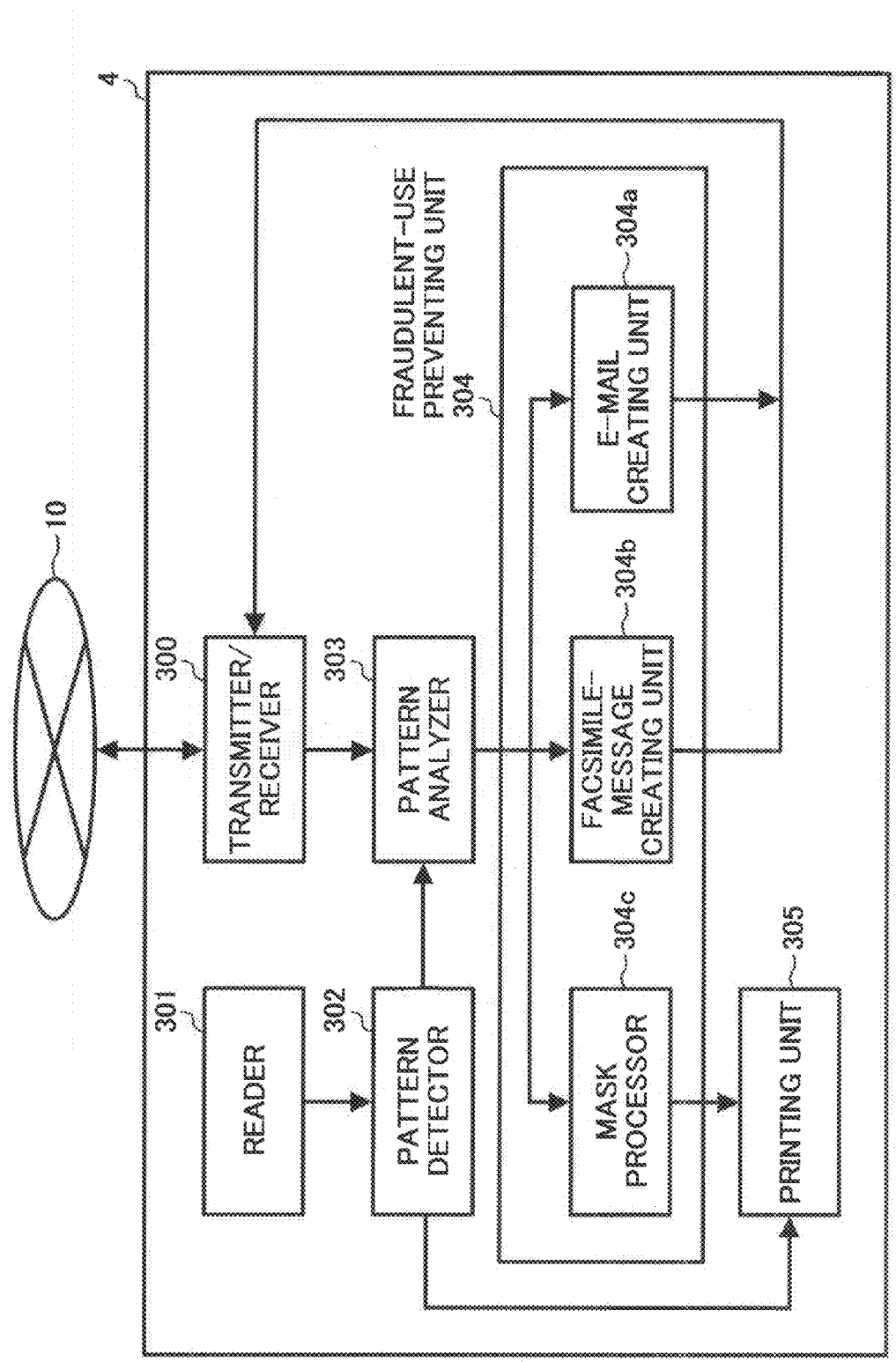
FIG. 12 is a block diagram of a multifunction product (MFP) shown in FIG. 1.

FIG. 12 is a block diagram of the MFP 4, which is one example of the image forming apparatus that detects a fraudulent use of image data. The image forming apparatus can be the printer 3. In this case, the printer 3 does not necessary include all of the configurations described below.

The MFP 4 includes a transmitter/receiver 300, a reader 301, a pattern detector 302, a pattern analyzer 303, a fraudulent-use preventing unit 304, and a printing unit 305. The fraudulent-use preventing unit 304 includes an email creating unit 304*a*, a facsimile-message creating unit 304*b*, and a mask processor 304*c*.

The transmitter/receiver 300 receives the fraudulent-use preventing pattern, and the fraudulent-use preventing process to be carried out when the image data added with the fraudulent-use preventing pattern is fraudulently used, from the transmitter/receiver 16 of the image control device 2. The transmitter/receiver 300 outputs the fraudulent-use preventing pattern and the fraudulent-use preventing process that are received, to the pattern analyzer 303.

The reader 301 reads the document image, and outputs the document image to the pattern detector 302 as image data. The pattern detector 302 detects whether a fraudulent-use preventing pattern is included in the image data output from the reader 301. The pattern detector 302 outputs the image data to the pattern analyzer 303 when the image data includes the fraudulent-use preventing pattern. On the other hand, the pattern detector 302 outputs the image data to the printing unit 305 when the image data does not include the fraudulent-use preventing pattern.

The pattern analyzer 303 receives the fraudulent-use preventing pattern, and the fraudulent-use preventing process to be carried out when the image data added with the fraudulent-use preventing pattern is fraudulently used, from the transmitter/receiver 300. When the pattern detector 302 detects the fraudulent-use preventing pattern in the image data, the pattern analyzer 303 analyzes the fraudulent-use preventing process based on the detected fraudulent-use preventing pattern. The pattern analyzer 303 outputs the information of the analyzed fraudulent-use preventing process and the image data to the fraudulent-use preventing unit 304.

When a fraudulent use is detected, the fraudulent-use preventing unit 304 executes the fraudulent-use preventing process analyzed by the pattern analyzer 303. When an email transmission to the designated email address is assigned as the fraudulent-use preventing process, the email creating unit 304*a* creates the email to be transmitted to the designated email address. The email creating unit 304*a* transmits the created email to the designated email address via the transmitter/receiver 300.

When a facsimile message transmission to a designated facsimile number is assigned as a fraudulent-use preventing process, the facsimile-message creating unit 304*b* creates a facsimile message to be transmitted to the designated facsimile number. The facsimile-message creating unit 304*b* transmits the created facsimile message to the designated facsimile number via the transmitter/receiver 300. When a blank paper output is assigned as a fraudulent-use preventing process, the mask processor 304*c* carries out a mask processing to the image data to output blank paper.

The printing unit 305 prints out image data from which a pattern is not detected by the pattern detector 302, or image data of which printing is permitted out of image data to which the fraudulent-use preventing process is carried out by the fraudulent-use preventing unit 304.

Figure 13:
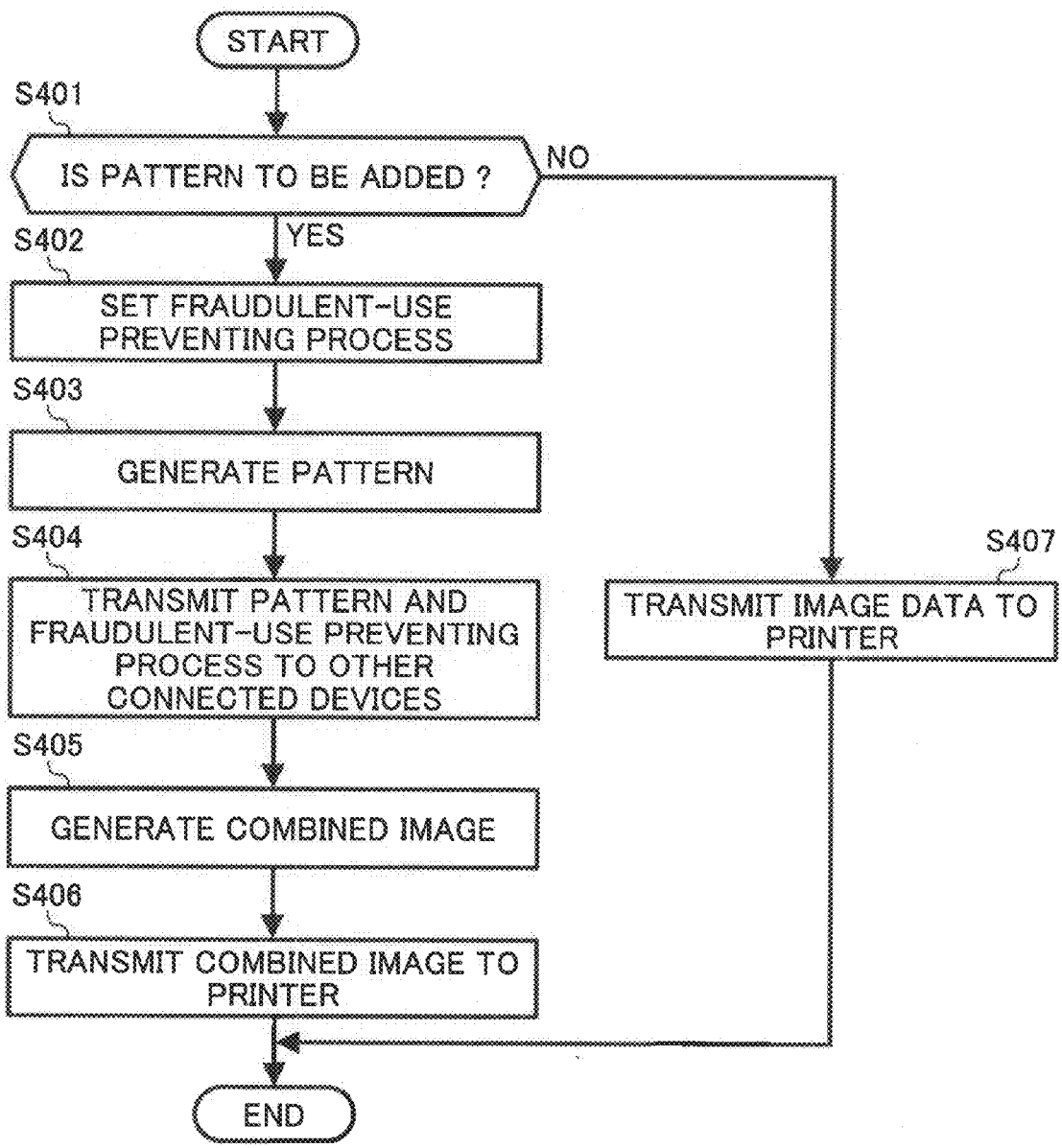
FIG. 13 is a flowchart of a processing of the image control device adding the fraudulent-use preventing pattern to an image at the time of printing.

FIG. 13 is a flowchart of a processing of the image control device adding a fraudulent-use preventing pattern to an image at the time of printing (the fraudulent-use preventing pattern can be added at an optional timing as well as at the time of printing). In the flowchart shown in FIG. 13, a fraudulent-use preventing pattern is simply expressed as a "pattern".

A user decides whether a fraudulent-use preventing pattern is to be added to a document image (step S401). When the fraudulent-use preventing pattern is to be added to a document image (step S401: Yes), the fraudulent-use-preventing-process setting unit 13 sets the fraudulent-use preventing process (step S402). Upon receiving a selection of the fraudulent-use preventing process, the pattern generator 14 generates a fraudulent-use preventing pattern (step S403). The transmitter/receiver 16 transmits the fraudulent-use preventing pattern generated by the pattern generator 14 and the fraudulent-use preventing process to other connected devices (step S404).

Thereafter, the combined image generator 15 combines the fraudulent-use preventing pattern with the print image, thereby generating a combined image (step S405). The transmitter/receiver 16 transmits the generated combined image to the printer 3 (step S406), and ends the processing shown in the flowchart. On the other hand, when the fraudulent-use preventing pattern is not to be added to a document image (step S401: No), the transmitter/receiver 16 transmits image data to the printer 3 (step S407), and ends the processing shown in the flowchart.

Based on the above processing, a fraudulent-use preventing process can be assigned, and a fraudulent-use preventing pattern can be added to the image data, and the result can be transmitted to the printer 3. The receiver 21 of the printer 3 receives the combined image and the image data that are transmitted to the printer 3 at step S406 and step S407. The printing unit 22 prints out the combined image and the image data, thereby obtaining a printed image.

Figure 14:
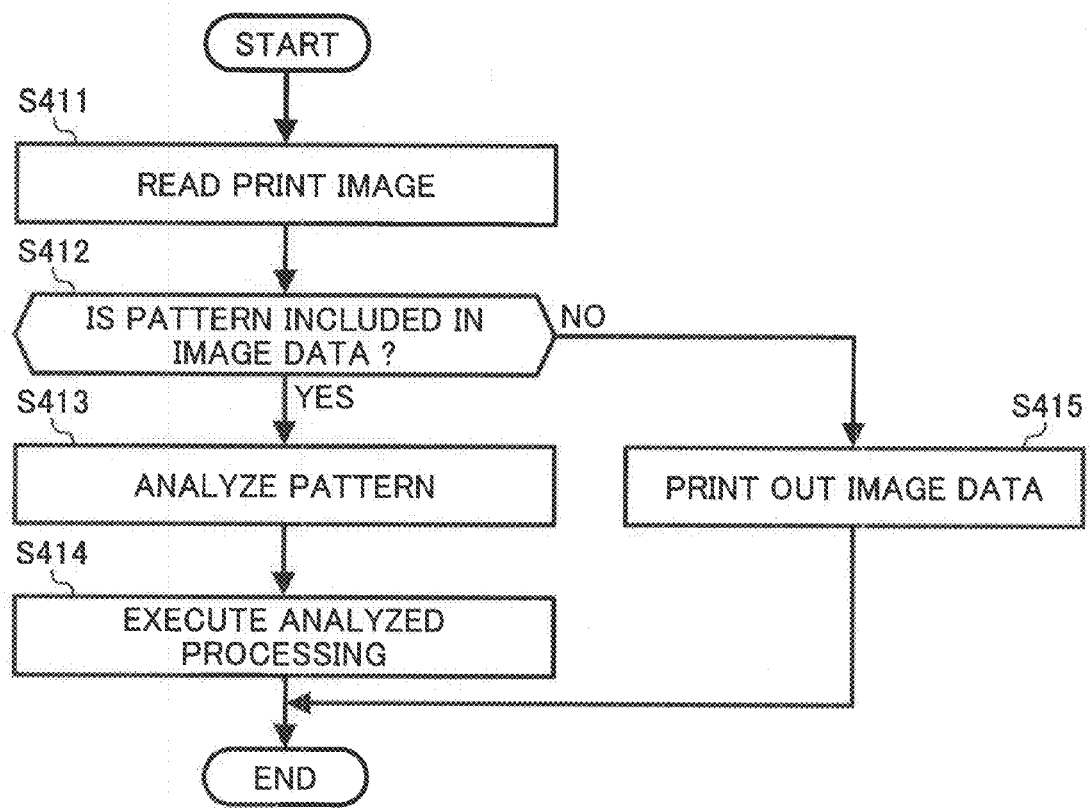
FIG. 14 is a flowchart of a processing carried out by the MFP at the time of copying.

FIG. 14 is a flowchart of a processing carried out by the MFP at the time of copying. The processing carried out by the MFP 4 at the time of copying an image printed out by the printer 3 is explained next. First, the reader 301 of the MFP 4 reads a print image (step S411). The pattern detector 302 detects whether the image data of the read print image includes a fraudulent-use preventing pattern (step S412).

When the image data includes a fraudulent-use preventing pattern (step S412: Yes), the pattern analyzer 303 analyzes the fraudulent-use preventing pattern (step S413). The fraudulent-use preventing unit 304 executes the analyzed processing (step S414), and ends the processing shown in the flowchart.

On the other hand, when the image data does not include a fraudulent-use preventing pattern (step S412: No), the printing unit 305 prints out the image data (step S415), and ends the processing shown in the flowchart.

Based on the above processing, the MFP 4 can detect a fraudulent-use preventing pattern from the read image data, and execute the fraudulent-use preventing process that is analyzed based on the detected fraudulent-use preventing pattern.

As explained above, the image control device 2 according to the first embodiment can optionally set a fraudulent-use preventing process. As the fraudulent-use preventing process, it is possible to assign an email transmission to a designated email address or a facsimile message transmission to a designated facsimile number. With the above configuration, the concerned parties can promptly know the fact that image data is fraudulently used or is about to be fraudulently used.

The printer 3 that prints out image data is required to have only the receiver 21 and the printing unit 22. The printer 3 can obtain a printed image added with a fraudulent-use preventing pattern, without using a device having a special function.

The image control system according to the first embodiment detects a fraudulent use of an output printed image. On the other hand, an image control system according to a second embodiment limits a print out of image data, thereby preventing the image data from being fraudulently printed. For example, once generated image data cannot be printed again. Alternatively, print out of the image data is admitted to only a specified user. When a plurality of image forming apparatuses (such as printers) are connected to a network, an image forming apparatus that is permitted to print out image data can be limited.

A network configuration of the image control system according to the second embodiment is similar to that of the image control system according to the first embodiment explained with reference to FIG. 1, and therefore, is not explained here.

Figure 15:
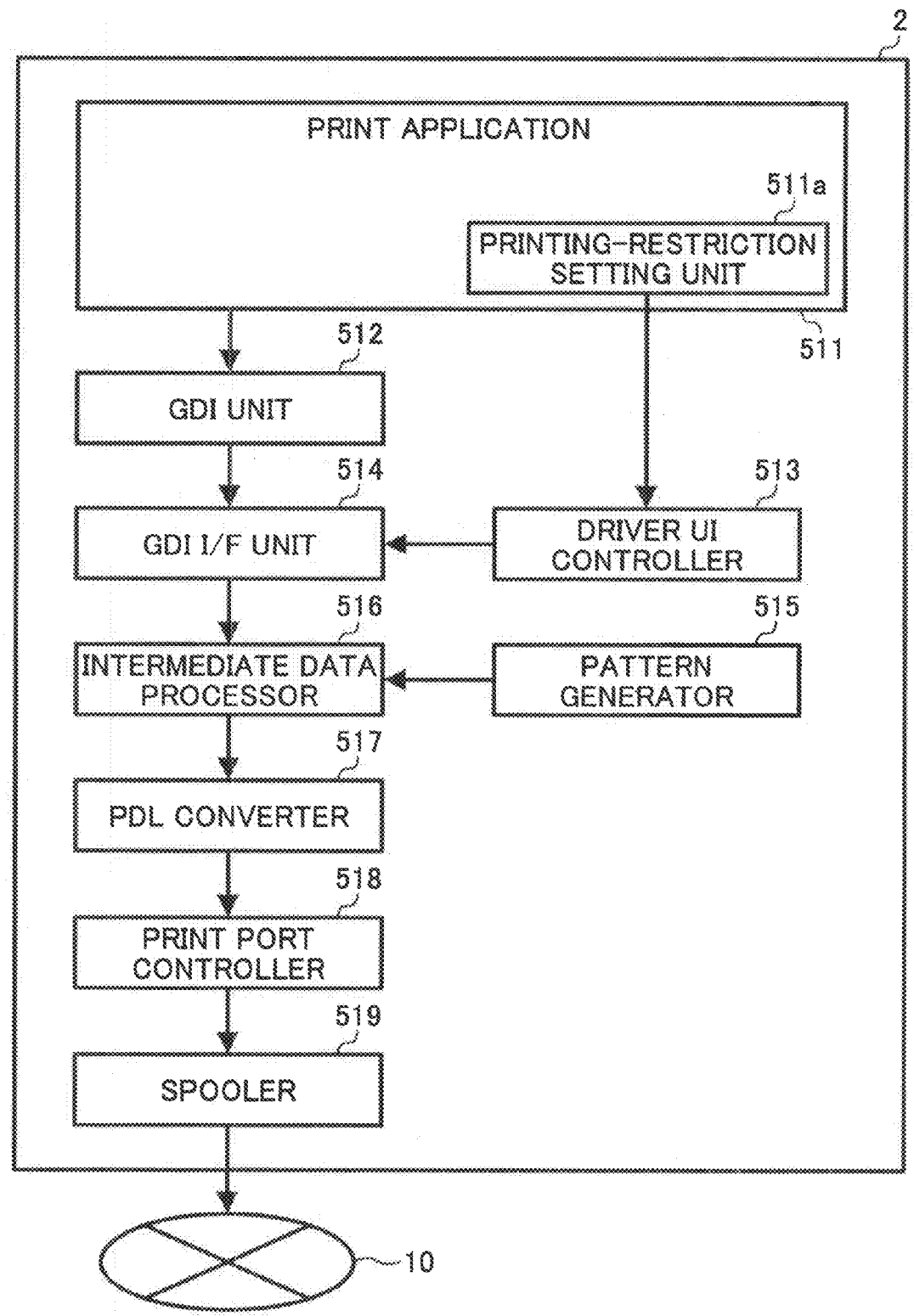
FIG. 15 is a block diagram of an image control apparatus according to a second embodiment of the present invention.

FIG. 15 is a block diagram of the image control device according to the second embodiment. A setting of a fraudulent-use preventing process based on a print application (a print driver) is explained. In the following explanation, names of units are based on the Windows (a registered trade name) environment.

In the image control device 2, a printing-restriction setting unit 511a is provided within a print application 511. The user launched the print application 511 to print a document image. The printing-restriction setting unit 511a sets a restriction on printing the document image. The restriction means that a print output of once created document image is not permitted again, or a print out of a document image is permitted to only a specific user, for example.

The print application 511 outputs a document image to a graphics device interface (GDI) unit 512. Alternatively, the print application 511 outputs information on a restriction set by the printing-restriction setting unit 511a to a driver user interface (UI) controller 513.

The GDI unit 512 converts the document image output by the print application 511 into graphic data. The GDI unit 512 also outputs the converted graphic data to a GDI interface (I/F) unit 514.

The driver UI controller 513 creates a printer job language (PJL) command that expresses the restriction set by the printing-restriction setting unit 511a. The driver UI controller 513 also outputs the created PJL command to the GDI I/F unit 514. In limiting the printing, a command of "@PJL SET PRINTLIMIT=ON" is generated.

The GDI I/F unit 514 converts the graphic data output from the GDI unit 512 into intermediate data. The GDI I/F unit 514 receives the PJL command from the driver UI controller 513. The GDI I/F unit 514 outputs the converted intermediate data and the PJL command to an intermediate data processor 516.

A pattern generator 515 generates a fraudulent-use preventing pattern. Details of the fraudulent-use preventing process pattern are similar to those according to the first embodiment, and therefore, are not explained. The pattern generator 515 converts the created fraudulent-use preventing pattern into intermediate data, and outputs the intermediate data to the intermediate data processor 516.

The intermediate data processor 516 receives the intermediate data of the document image and the PJL command output from the GDI I/F unit 514, and the intermediate data of the fraudulent-use preventing pattern output from the pattern generator 515. The intermediate data processor 516 multiplies the intermediate data output from the GDI I/F unit 514 to integrate or print posters. The intermediate data processor 516 also combines the intermediate data of the document image output from the GDI I/F unit 514, and the intermediate data of the fraudulent-use preventing pattern output from the pattern generator 515. The intermediate data processor 516 outputs the combined intermediate data and the PJL command to a page description language (PDL) converter 517.

The PDL converter 517 receives the intermediate data and the PJL command from the intermediate data processor 516. The PDL converter 517 converts the intermediate data received from the intermediate data processor 516 into a printer language as data for printing. The PDL converter 517 outputs the converted print data and the PJL command to a print port controller 518.

The print port controller 518 outputs the print data and the PJL command output from the PDL converter 517 to a spooler 519. The spooler 519 transmits the print data and the PJL command output from the print port controller 518, to the printer 3 via the network 10.

The print data transmitted to the printer 3 in this way is processed based on the PJL command. For example, when the number of print out is set to a constant number, a print out of the data for more than the constant number is regarded as a fraudulent printing, and the printing thereof is not carried out. When it is set that an email is to be transmitted to a designated email address when a fraudulent printing is attempted, an email is transmitted to the designated email address.

As described above, the image control device according to the second embodiment can prevent a fraudulent use of output printed image as well as fraudulent printing of image data.

In the image control system according to the first embodiment, the image control device 2 adds a fraudulent-use preventing pattern, and outputs the fraudulent-use preventing pattern to the printer 3. On the other hand, in an image control system according to a third embodiment of the present invention, an image forming apparatus that prints out image data adds the fraudulent-use preventing pattern.

A network configuration of the image control system according to the third embodiment is similar to that of the image control system according to the first embodiment explained with reference to FIG. 1, and therefore, is not explained herein.

Figure 16:
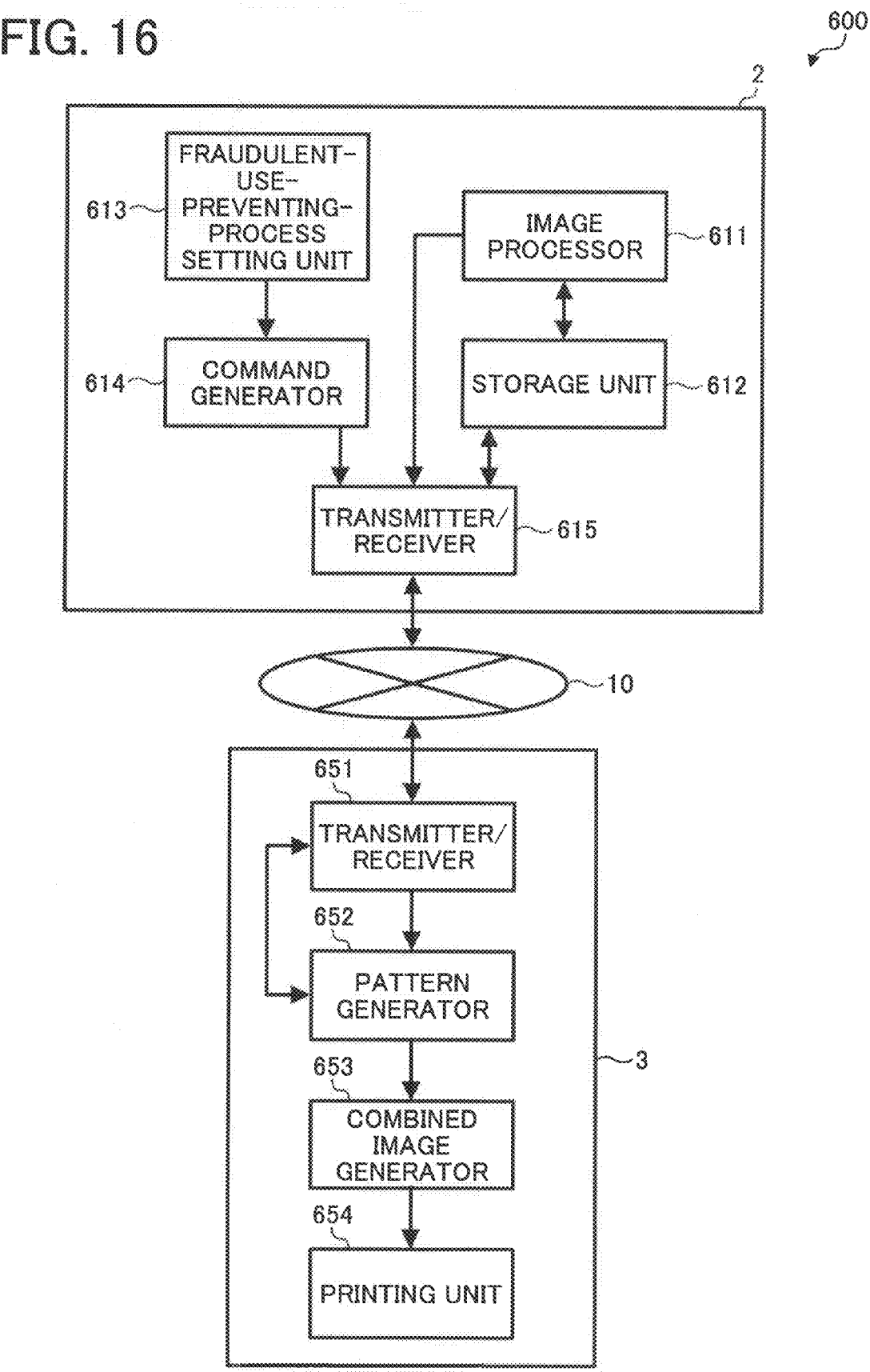
FIG. 16 is a block diagram of an image control device and an image forming apparatus in an image control system according to a third embodiment of the present invention.

FIG. 16 is a block diagram of the image control device and the image forming apparatus. The printer 3 is used as the image forming apparatus that prints out image data output from the image control device 2. The MFP 4 can be also used as the image forming apparatus.

The image control device 2 includes an image processor 611, a storage unit 612, a fraudulent-use-preventing-process setting unit 613, a command generator 614, and a transmitter/receiver 615.

The image processor 611 generates and edits image data, and also edits image data stored in the storage unit 612, described later. The storage unit 612 stores image data generated and edited by the image processor 611. The storage unit 612 also stores image data obtained from other connected devices via the transmitter/receiver 615, described later.

The fraudulent-use-preventing-process setting unit 613 sets a processing to be carried out when individual image data are used fraudulently (hereinafter, "a fraudulent-use preventing process"). The fraudulent-use-preventing-process setting unit 613 also sets which kind of use is a fraudulent use of the individual image data. Details of the fraudulent-use-preventing-process setting unit 613 are similar to those of the fraudulent-use-preventing-process setting unit 13 of the image control device 2 according to the first embodiment, and therefore, are not explained herein.

The command generator 614 generates a command corresponding to the fraudulent-use preventing process set by the fraudulent-use-preventing-process setting unit 613. The command generated by the command generator 614 is embedded into a fraudulent-use preventing pattern generated by a pattern generator 652 of the printer 3, described later.

The transmitter/receiver 615 is connected to the network 10, and transmits image data of which printing is requested out of the image data stored in the storage unit 612 or the image data generated and edited by the image processor 611, to the printer 3. The transmitter/receiver 615 transmits the command generated by the command generator 614 to the printer 3, and also exchanges data with other devices connected to the network 10.

The printer 3 includes a transmitter/receiver 651, the pattern generator 652, a combined image generator 653, and a printing unit 654. The transmitter/receiver 651 is connected to the network 10, and receives the image data and the command transmitted from the image control device 2. The transmitter/ receiver 651 outputs the received image data to the combined image generator 653, and outputs the received command to the pattern generator 652.

The pattern generator 652 generates a fraudulent-use preventing pattern based on the command output from the transmitter/receiver 651. Details of the pattern generator 652 are similar to those of the pattern generator 14 of the image control device 2 according to the first embodiment, and therefore, are not explained herein. The pattern generator 652 outputs the generated fraudulent-use preventing pattern and the information of the fraudulent-use preventing process to be carried out when the image data added with the fraudulent-use preventing pattern is used fraudulently, to the transmitter/receiver 651. The fraudulent-use preventing pattern and the information of the fraudulent-use preventing process that are output are transmitted to other devices connected to the network 10, and are used to detect fraudulent use of image data.

The combined image generator 653 combines the basic pattern generated by the pattern generator 652 with the print image data received by the transmitter/receiver 651, thereby generating a combined image. Details of the combined image generator 653 are similar to those of the combined image generator 15 of the image control device 2 according to the first embodiment, and therefore, are not explained herein. The printing unit 654 prints out the combined image generated by the combined image generator 653.

Figure 17:
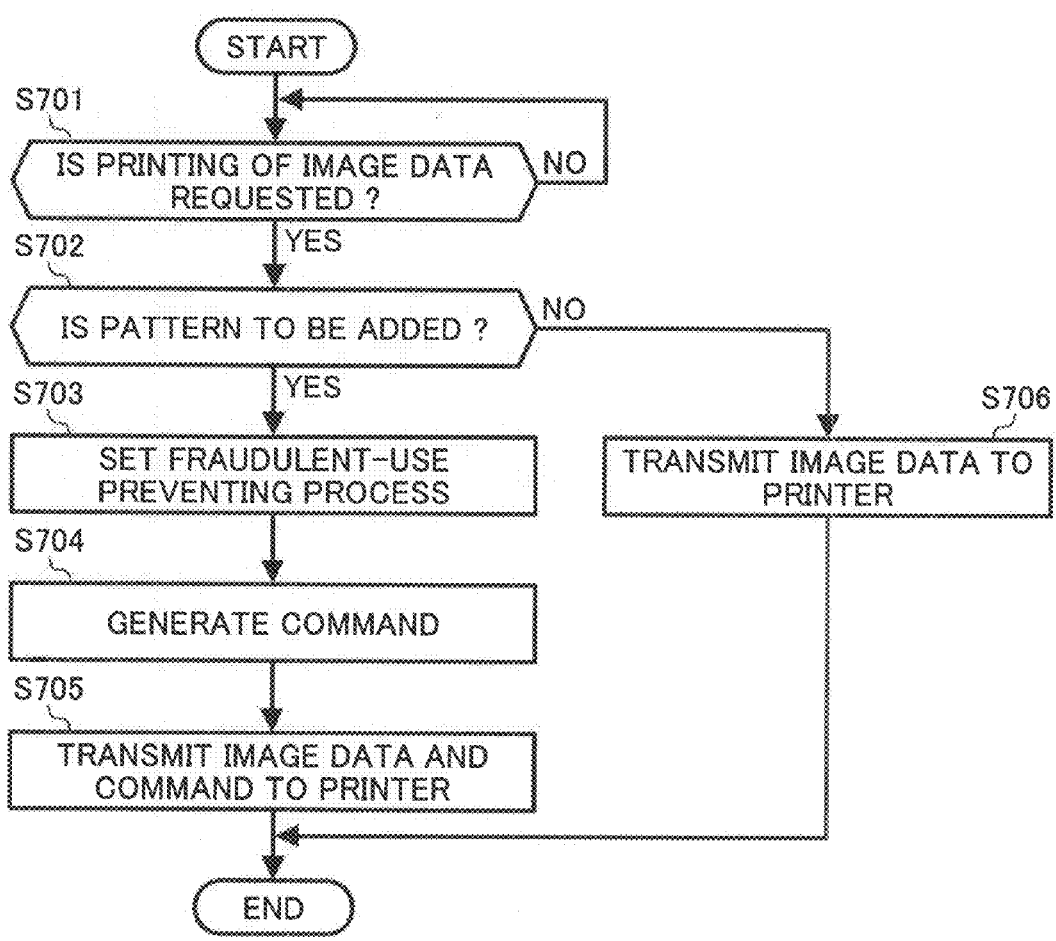
FIG. 17 is a flowchart of a processing of the image control device transmitting print-requested image data to a printer.

The user can request the image data generated, edited, and stored by the image control device 2 to be printed using the application, thereby making the printer 3 print out the image data. FIG. 17 is a flowchart of a processing of the image control device transmitting print-requested image data to the printer. When the printing of image data is requested (step S701: Yes)., the image control device 2 determines whether a fraudulent-use preventing pattern is to be added to the image data (step S702). The fraudulent-use preventing pattern can be added to the image data during the editing of the image data, not only when the printing is requested.

When the fraudulent-use preventing pattern is to be added (step S702: Yes), the fraudulent-use-preventing-process setting unit 613 sets the fraudulent-use preventing process (step S703). The command generator 614 generates a command corresponding to the set fraudulent-use preventing process (step S704).

The transmitter/receiver 615 transmits the print-requested image data and the command generated at step S704 to the printer 3 (step S705), and ends the processing shown in the flowchart. When the fraudulent-use preventing pattern is not to be added (step S702: No), only the print-requested image data is transmitted to the printer 3 (step S706), and ends the processing shown in the flowchart.

FIG. 18 is a flowchart of the processing of the printer printing out the image data transmitted from the image control device. Upon receiving the image data (step S711), the transmitter/receiver 651 determines whether a command is also received together with the image data (step S712). When the command is received (step S712: Yes), the pattern generator 652 generates a fraudulent-use preventing pattern based on the received command (step S713). The pattern generator 652 transmits the generated fraudulent-use preventing pattern and the command to other devices connected to the network 10 via the transmitter/receiver 651 (step S714).

The combined image generator 653 combines the image data with the fraudulent-use preventing pattern, thereby generating a combined image (step S715). The printing unit 654 prints out the combined image (step S716), and ends the processing shown in the flowchart. When a command is not received (step S712: No), the printing unit 654 prints out the image data (step S717), and ends the processing shown in the flowchart.

Based on the above processing, the printer 3 prints out the image data transmitted from the image control device 2. With this arrangement, the printer 3 can generate the fraudulent-use preventing pattern based on the fraudulent-use preventing process set by the image control device 2, add the pattern to the image data, and print out the image data added with this pattern.

As explained above, according to the present invention, a user can set the processing to be carried out when an image is used fraudulently. As a result, different processings can be set depending on confidentiality of the image. While maintaining the availability of information, safety of the information can be further ensured. The invention can be also applied to prevent information leakage due to erroneous distribution of the image data.

When the processing to be carried out at the time of fraudulent use of an image is assigned to an email transmission to a designated email address, concerned parties can promptly know the fact that image data is fraudulently used or is about to be fraudulently used. Particularly when the setting of an image fraudulent-use preventing process is changed for each time window, possibility of preventing the information leakage due to fraudulent use of the image can be increased.

A device that adds a fraudulent-use preventing pattern can be set optionally. Therefore, even when an image forming apparatus having the fraudulent-use preventing pattern adding function is not available, other devices can add the fraudulent-use preventing pattern to the document.

According to the present invention, the user can set a processing to be carried out when image data is used fraudulently. Concerned parties can promptly know the fact that image data is fraudulently used or is about to be fraudulently used. Even when an image forming apparatus having the fraudulent-use preventing pattern adding function is not available, other devices can add the fraudulent-use preventing pattern to the image.

The image control method explained in the present embodiment can be realized by making a computer, such as a PC or a work station, execute a program that is prepared beforehand. The program is stored in a computer-readable recording medium, such as a hard disk, a flexible disk, a compact disk read only memory (CD-ROM), a magneto optical disk (MO), and a digital versatile disk (DVD), and is executed by being read from the recording medium by the computer. The program can be a transmission medium that can be distributed via a network such as the Internet.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image control system, comprising:
an image control apparatus; and
an image forming apparatus, wherein
the image control apparatus includes
a process setting unit configured to set information on a process used for preventing a fraudulent use of the image, to determine what kind of uses are a fraudulent use, and to receive information from a user specifying a particular action to be performed when a fraudulent use occurs, a pattern generating unit configured to generate a pattern for preventing the fraudulent use of the image based on the information, an image combining unit configured to combine the image with the pattern to generate a combined image, and a transmitting unit configured to transmit the combined image to the image forming apparatus; and the image forming apparatus includes a receiving unit configured to receive the combined image from the image control apparatus, and a printing unit configured to print out the combined image.

2. The image control system according to claim 1, wherein the image forming apparatus further includes a pattern detecting unit configured to detect the pattern from the combined image; and a fraudulent-use preventing unit configured to carry out the process based on the pattern detected.

3. The image control system according to claim 1, wherein the image control apparatus further includes a part-setting button that makes the image control apparatus add the pattern to only a part of the image.

4. The image control system according to claim 1, wherein the image control apparatus further includes a pattern-detailed-setting button for setting details of the pattern, the setting details include a detection item which is used to detect a fraudulent use of the image when a printed material combined with the pattern is handled as the detection item, and an action which is a processing to be carried out when the fraudulent use of the printed material combined with the pattern is detected.

5. An image control system, comprising:

an image control apparatus; and an image forming apparatus, wherein the image control apparatus includes a process setting unit configured to set information on a process used for preventing a fraudulent use of the image, to determine what kind of uses are a fraudulent use, and to receive information from a user specifying a particular action to be performed when a fraudulent use occurs; and a transmitting unit configured to transmit the information and the image to the image forming apparatus, and the image forming apparatus includes a receiving unit configured to receive the information and the image from the image control apparatus;

a pattern generating unit configured to generate a pattern for preventing the fraudulent use of the image based on the information;

an image combining unit configured to combine the image with the pattern to generate a combined image; and a printing unit configured to print out the combined image.

6. The image control system according to claim 5, wherein the image forming apparatus further includes a pattern detecting unit configured to detect the pattern from the combined image; and a fraudulent-use preventing unit configured to carry out a process based on the pattern detected.

7. An image control apparatus, comprising:

a process setting unit configured to set information on a process used for preventing a fraudulent use of an image, to determine what kind of uses are a fraudulent use, and to receive information from a user specifying a particular action to be performed when a fraudulent use occurs;

a pattern generating unit configured to generate a pattern for preventing the fraudulent use of the image based on the information;

an image combining unit configured to combine the image with the pattern to generate a combined image; and a transmitting unit configured to transmit the combined image to an image forming apparatus.

8. The image control apparatus according to claim 7, wherein the process includes at least one of a masking of the image, an email transmission to a predetermined email address, a facsimile transmission to a predetermined facsimile number, and a restriction to a printing of the image.

9. The image control apparatus according to claim 8, wherein the process varies depending on a time window.

10. An image control apparatus, comprising:

a process setting unit configured to set information on a process for preventing a fraudulent use of an image, to determine what kind of uses are a fraudulent use, and to receive information from a user specifying a particular action to be performed when a fraudulent use occurs; and a transmitting unit configured to transmit the information and the image to an image forming apparatus.

11. The image control apparatus according to claim 10, wherein the process includes at least one of a masking of the image, an email transmission to a predetermined email address, a facsimile transmission to a predetermined facsimile number, and a restriction to a printing of the image.

12. The image control apparatus according to claim 11, wherein the process varies depending on a time window.

13. An image forming apparatus, comprising:

a receiving unit configured to receive a combined image from an image control apparatus; and a printing unit configured to print out the combined image, wherein the image control apparatus generates a pattern based on information on a process used for preventing a fraudulent use of an image, determines what kind of uses are a fraudulent use, receives information from a user specifying a particular action to be performed when a fraudulent use occurs, and combines the image with the pattern to generate the combined image.

14. The image forming apparatus according to claim 13, further comprising:

a pattern detecting unit configured to detect the pattern from the combined image; and a fraudulent-use preventing unit configured to carry out the process based on the pattern detected.

15. The image forming apparatus according to claim 13, wherein the process includes at least one of a masking of the image, an email transmission to a predetermined email address, a facsimile transmission to a predetermined facsimile number, and a restriction to a printing of the image.

16. The image forming apparatus according to claim 15, wherein the process varies depending on a time window.

17. An image forming apparatus, comprising:

a receiving unit configured to receive an image and information on a process used for preventing a fraudulent use of the image and on what kind of uses are a fraudulent use, and to receive information from a user specifying a particular action to be performed when a fraudulent use occurs, from an image control apparatus;

a pattern generating unit configured to generate a pattern for preventing the fraudulent use of the image based on the information;

an image combining unit configured to combine the image with the pattern to generate a combined image; and a printing unit configured to print out the combined image.

18. The image forming apparatus according to claim 17, further comprising:

a pattern detecting unit configured to detect the pattern from the combined image; and a fraudulent-use preventing unit configured to carry out the process based on the pattern detected.

19. The image forming apparatus according to claim 17, wherein the process includes at least one of a masking of the image, an email transmission to a predetermined email address, a facsimile transmission to a predetermined facsimile number, and a restriction to a printing of the image.

20. The image forming apparatus according to claim 19, wherein the process varies depending on a time window.

21. An image control method, comprising:

setting information on a process used for preventing a fraudulent use of an image;

determining what kind of uses are a fraudulent use;

receiving information from a user specifying a particular action to be performed when a fraudulent use occurs;

generating a pattern for preventing the fraudulent use of the image based on the information;

combining the image with the pattern to generate a combined image; and printing out the combined image.

22. The image control method according to claim 21, further comprising:

detecting the pattern from the combined image; and carrying out the process based on the pattern detected.

23. The image control method according to claim 21, wherein the process includes at least one of a masking of the image, an email transmission to a predetermined email address, a facsimile transmission to a predetermined facsimile number, and a restriction to a printing of the image.

24. The image control method according to claim 23, wherein the process varies depending on a time window.

25. A computer-readable recording medium that stores a computer program for an image control, wherein the computer program causes a computer to execute:

setting information on a process used for preventing a fraudulent use of an image;

determining what kind of uses are a fraudulent use;

receiving information from a user specifying a particular action to be performed when a fraudulent use occurs;

generating a pattern for preventing the fraudulent use of the image based on the information;

combining the image with the pattern to generate a combined image; and printing out the combined image.

26. The computer-readable recording medium according to claim 25, wherein the computer program further causes the computer to execute:

detecting the pattern from the combined image; and carrying out the process based on the pattern detected.

27. The computer-readable recording medium according to claim 25, wherein the process includes at least one of a masking of the image, an email transmission to a predetermined email address, a facsimile transmission to a predetermined facsimile number, and a restriction to a printing of the image.

28. The computer-readable recording medium according to claim 27, wherein the process varies depending on a time window.

\* \* \* \* \*